United States Patent [19]

Zimmer

[11] Patent Number: 5,305,652
[45] Date of Patent: Apr. 26, 1994

[54] MULTIAXIAL INDUSTRIAL ROBOT

[75] Inventor: Ernst Zimmer, Friedberg, Fed. Rep. of Germany

[73] Assignee: Kuka Schweissanlagen + Robotor GmbH, Augsburg, Fed. Rep. of Germany

[21] Appl. No.: 915,804
[22] PCT Filed: Dec. 20, 1990
[86] PCT No.: PCT/EP90/02268
  § 371 Date: Jul. 21, 1992
  § 102(e) Date: Jul. 21, 1992
[87] PCT Pub. No.: WO91/11299
  PCT Pub. Date: Aug. 8, 1991

[30] Foreign Application Priority Data

Jan. 23, 1990 [DE] Fed. Rep. of Germany ....... 4001885

[51] Int. Cl.$^5$ ............... B25J 11/00; G05G 11/00
[52] U.S. Cl. ................... 74/479 B; 901/19; 901/48
[58] Field of Search ............... 74/479, 479 B, 479 BP; 901/19, 23, 48

[56] References Cited

U.S. PATENT DOCUMENTS

| | | | |
|---|---|---|---|
| 4,062,455 | 12/1977 | Flatau | 901/48 X |
| 4,502,830 | 3/1985 | Inaba et al. | 414/735 |
| 4,552,505 | 11/1985 | Gorman | 901/23 X |
| 4,636,138 | 1/1987 | Gorman | 901/48 X |
| 4,733,576 | 3/1988 | Zimmer et al. | 901/23 X |
| 4,812,104 | 3/1989 | Suzuki | 901/23 X |
| 4,828,451 | 5/1989 | Mikoshi et al. | 414/680 |
| 4,842,474 | 6/1989 | Torii et al. | 901/48 X |

FOREIGN PATENT DOCUMENTS

| | | |
|---|---|---|
| 3050870C2 | 7/1982 | Fed. Rep. of Germany . |
| 3301022A1 | 7/1984 | Fed. Rep. of Germany . |
| 8525812 | 2/1987 | Fed. Rep. of Germany . |
| 1-210280 | 8/1989 | Japan .................. 901/23 |

Primary Examiner—Leslie A. Braun
Assistant Examiner—David W. Laub
Attorney, Agent, or Firm—McGlew & Tuttle

[57] ABSTRACT

The invention concerns a multiaxial industrial robot (1), including of a mount (2), a rotatable and swingable rocker (3), a swingable extension arm (6) and a multi-member rotatable and swingable robot hand (8), whose members are driven by motors (10, 11, 12) arranged on extension arm (6). Extension arm (6) is mounted (27) on one side on a one-arm formed rocker (4), whereby at least two motors (10, 11, 12) are arranged next to each other on the extension arm in the direction of extension of its swinging axis (7). With a triangular arrangement, motors (10, 11, 12) are arranged with their motor axes (13) in an isosceles triangle, whose base is oriented to bearing (27) of extension arm (6). Motors (10, 11, 12) are alternatively directed with their driven side (15) to robot hand (8) and are arranged closely next to one another and at a distance behind bearing (27) at the end of extension arm (6) or are arranged in reverse position with their driven side (15) pointing away from robot hand (8) at the level of bearing (27).

19 Claims, 10 Drawing Sheets

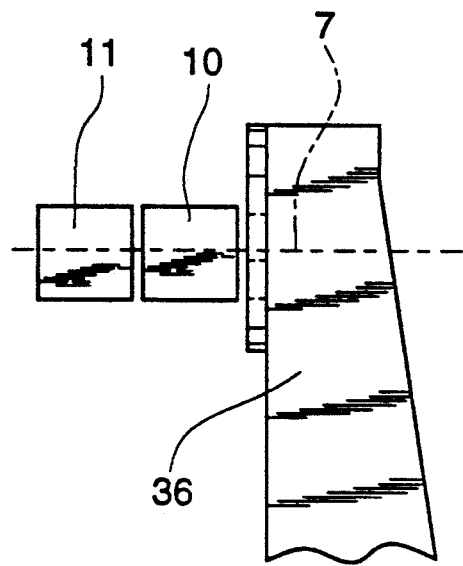
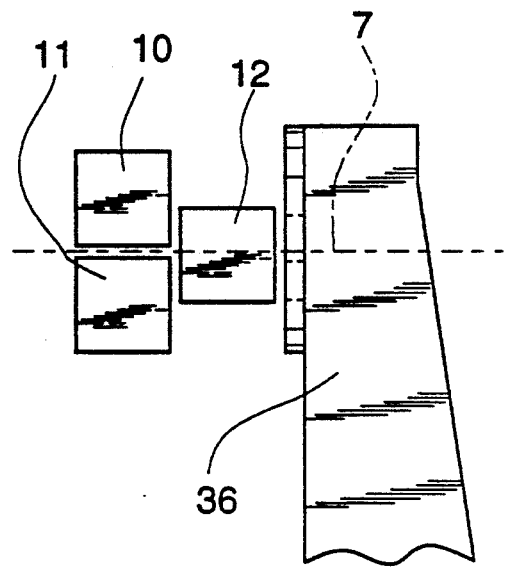
*Fig. 8*     *Fig. 9*
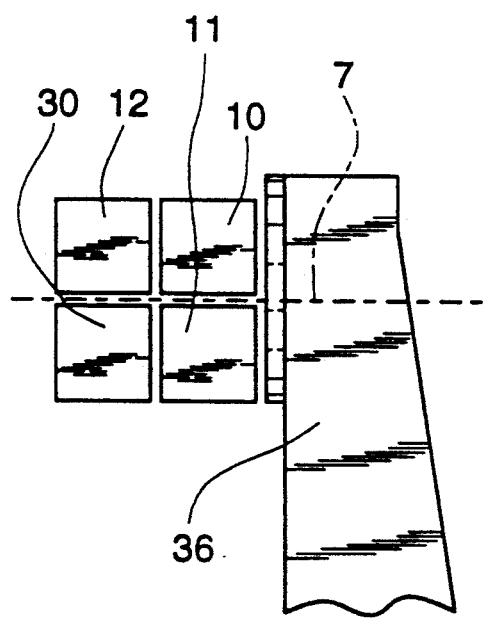
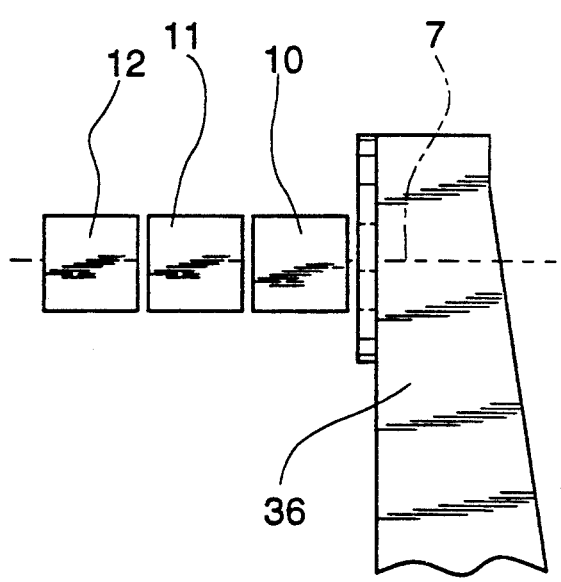
*Fig. 10*     *Fig. 11*

MULTIAXIAL INDUSTRIAL ROBOT

FIELD OF THE INVENTION

The invention concerns a multiaxial industrial robot an in particular to a robot that has a plurality of motors mounted on an extension arm, with the center of gravity of these motors having a specific position with regard to axes of rotation.

BACKGROUND OF THE INVENTION

Such robots are known in practice in a great many embodiments. Usually, three motors are present for driving three hand axes, which are arranged in a row above one another and are thus straddled in a fan-shaped manner. This arrangement causes difficulties with respect to optimizing dimensions and mass balance.

SUMMARY AND OBJECTS OF THE INVENTION

It is the object of the present invention to improve the mass balance in the case of a multiaxial industrial robot, particularly on the extension arm, in combination with a low construction cost and a high bearing load.

The present invention achieves this object in a multiaxial robot having a rocker arm rotatably connected to a mount or base about a principal rotating axis. Another end of the rocker arm is pivotably connected to an extension arm about an extension swing axis extending laterally from a side of the rocker arm. A robot hand with a plurality of members is connected to the extension arm and each of these members is driven by a motor positioned on the extension arm. At least two of these motors are positioned adjacent each other in a direction of the extension swing axis. These plurality of motors are also positioned so that the principal rotating axis extends in an area between a center of gravity of the plurality of motors and a side of the rocker arm.

The arrangement of the motors according to the invention makes possible a better mass balance, in combination with a one-arm rocker, with respect to the rotating axis around which the rocker rotates with the extension arm. It is recommended hereby for the most extensive optimizing of the mass balance to arrange the center of gravity of the motor arrangement at a distance from the rocker and on the other side of its rotating axis. The preferred axial-symmetric motor arrangement also serves the same purpose.

In addition, with the use of an extension arm which can be swung overhead, there results the advantage that the motor group is constructed more compactly in height and can be arranged for this purpose correspondingly further away from the swinging axis of the extension arm, without requiring a larger swinging radius. A better mass balance around the extension arm-swinging axis can be obtained thereby, without having to lengthen the rocker in order to make available sufficient free space for the rotations of the extension arm.

The better mass balance makes possible in its turn an increase in the permissible bearing load of the industrial robot, despite the one-side mounting of the extension arm on the rocker. The one-arm rocker construction and the one-side mounting reduce in turn the construction cost.

The compact arrangement of the motors also permits the drive shafts of the robot hand to be formed as universal shafts and, e.g., to be attached directly onto the motor axes. The previously known fan arrangement brings about greater angular distances between the drive shafts and the motor axes and requires the attachment of intermediate shafts and intermediate mountings. With the motor arrangement of the invention, the angles are reduced to such an extent that these intermediate components can be omitted as desired, thus reducing the construction cost. In all, the industrial robot according to the invention is more cost favorable and more maintenance-friendly due to the various savings.

Further advantages of the universal shaft arrangement consist of the uniform formation of the drive shafts and the use of the same shaft components. Universal shafts can be easily balanced remotely and offer a stable running state even with high rpm.

The motor arrangement according to the invention is provided for two or more motors. In the examples of the embodiments, various possibilities for realization with differing number and arrangements of the motors are provided. For example, if four or more motors and drive shafts are required, they can be arranged on the extension arm while maintaining the given advantages.

Usually a robot hand consists of three axes with as many motors, which are arranged in an isosceles triangle for purposes of mass balance with respect to the rocker rotating axis and the extension-arm swinging axis. Each time, depending on the orientation of the triangle, the mass balance is intensely optimized once, and so is the construction expense. In the preferred form of embodiment, the base of the triangle is directed to the extension-arm bearing, which optimizes the construction cost due to a simpler bearing configuration with sufficient mass balance around the swinging-rotating axis.

The rocker is provided with a corner piece for further improvement of the mass balance. This is preferably selected large enough so that with a triangular arrangement of the motors, the two motors next to the bearing lie in a common plane as much as possible with the rotating axis of the rocker.

The motors may be attached in the conventional orientation on the extension arm at some distance behind its swinging axis. They then lie close to each other in order to save as much height as possible and to obtain some distance from the swinging axis of the extension arm for this purpose.

The distribution of the motors according to the invention, however, makes it possible to attach the motors in a reverse manner in order to be able to construct the extension arm in as compact and short a form as possible. This offers the advantage of a greater mobility, whereby the mass balance is achieved via the counterweight of the reversing drive, and if necessary, by additional weights. Further, universal shafts with the previously described advantages can also be used with the reversed motor orientation.

The increased mobility is particularly associated with a two-part rocker construction for bearing. In this case, the rotating axis is provided as a so-called rocker rotating axis between the two rocker parts. The given concept, however, can also be combined with a conventional type of construction, in which the rocker is not rotatable by itself, but only by means of the mount. In this case, the mount-rotating axis or the first main axis is to be viewed as the rotating axis of the rocker, around which the forked mount can rotate with all the subsequent structural groups opposite the ground.

As a third possibility, a combination of the two structural shapes comes into play, which provides both a rocker-rotating axis, as well as a mount-rotating axis. This provides a seven-axial industrial robot with outstanding mobility.

The divided rocker construction and the transfer of the rotating axis into the rocker also make possible an improved mass balance of the rocker itself. The rotational drive for this rocker-rotating axis can then be displaced as far as possible downward and behind the horizontal swinging axis around which the rocker swings opposite the mount.

In all, a robot with a divided rocker is optimally balanced with respect to the masses that are moved with minimal construction cost and maximum mobility. Two such robots can be positioned directly next to one another due to the minimized dimensions and also may be placed in difficult-to-access positions, such as, for example, hidden angles in the trunk space of an automobile body. Robots of this structural type may also be positioned behind wall openings, without truncating too much of their operational range and their mobility, as is the case in conventional constructions.

Further advantageous embodiments of the industrial robot of the invention are given in the subclaims.

BRIEF DESCRIPTION OF THE DRAWINGS

In the drawings:

FIGS. 5, 5a, 5b and 6 show variants of the arrangement of the industrial robot of FIGS. 3 and 4;

FIGS. 8-11 show variants of mounting the motors on the extension arm; and

DETAILED DESCRIPTION OF THE PREFERRED EMBODIMENT

Figure 7:
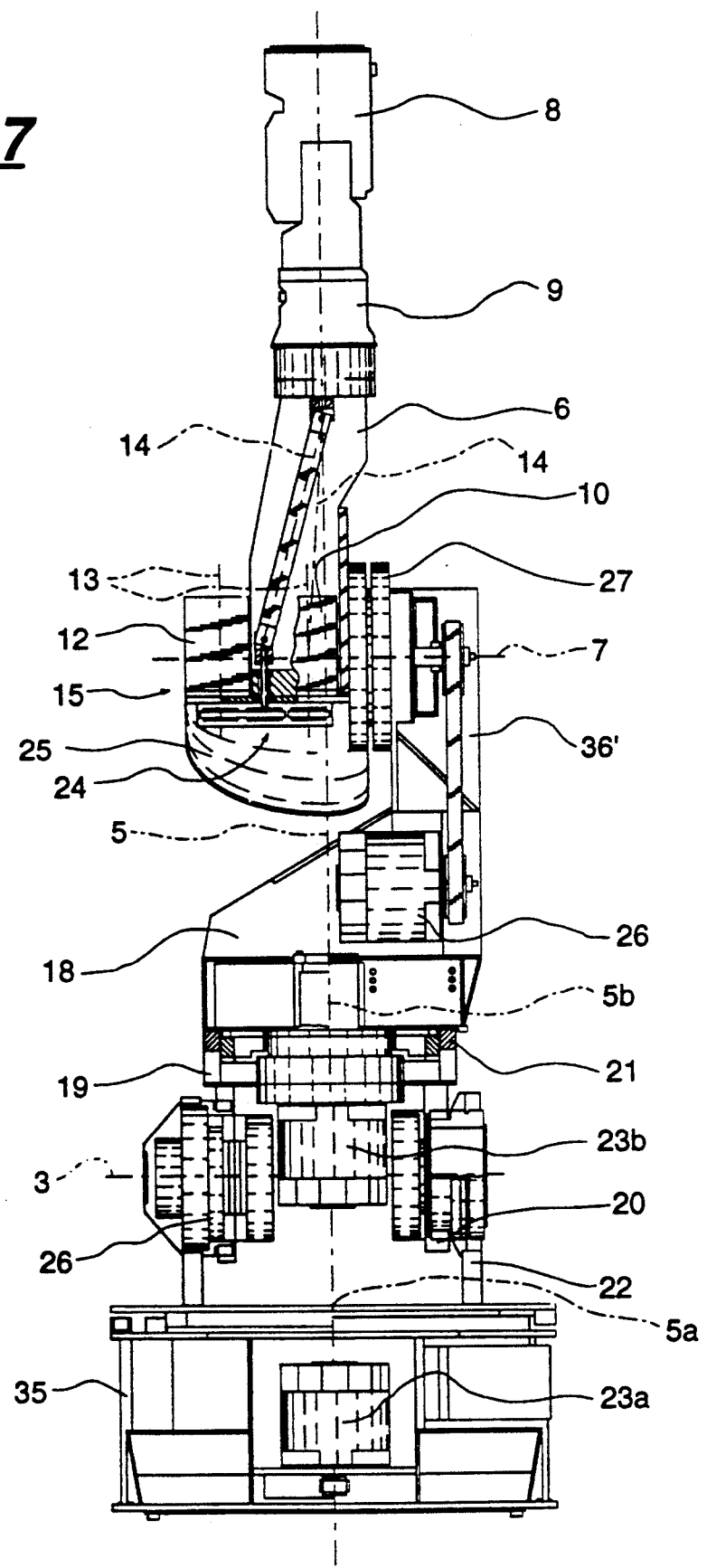
FIG. 7 shows a variant of the industrial robot of FIGS. 1-4 with mount-rotating axis and rocker-rotating axis.

The industrial robot 1 represented in the drawings consists of a mount 35, a rocker 36, an extension arm 6 as well as a robot hand 8 and has in FIGS. 1-6 six rotary axes and in FIG. 7 seven axes. Alternatively, the industrial robot can be arranged in any position, whereby it is, for example, suspended at a portal or is attached on the side to a wall.

The axes are different with respect to the swinging and rotating axes, whereby the swinging axes in the depicted robot arrangement run crosswise to the extension of the robot structural group and as a rule horizontally. The swinging angles are for the most part also limited. The rotational axes, on the other hand, extend lengthwise to the respective robot structural group or in the vertical plane. They permit as a rule greater rotational angles than the swinging axes.

Rocker 36 can rotate around one or several axes. The axis arranged next to an extension swinging axis 7 of extension arm 6, which is denoted uniformly in the description as principal rotating axis 5 is particularly relevant for the mass balance. This uniform concept for the different examples of embodiment will be explained below.

Figure 1:
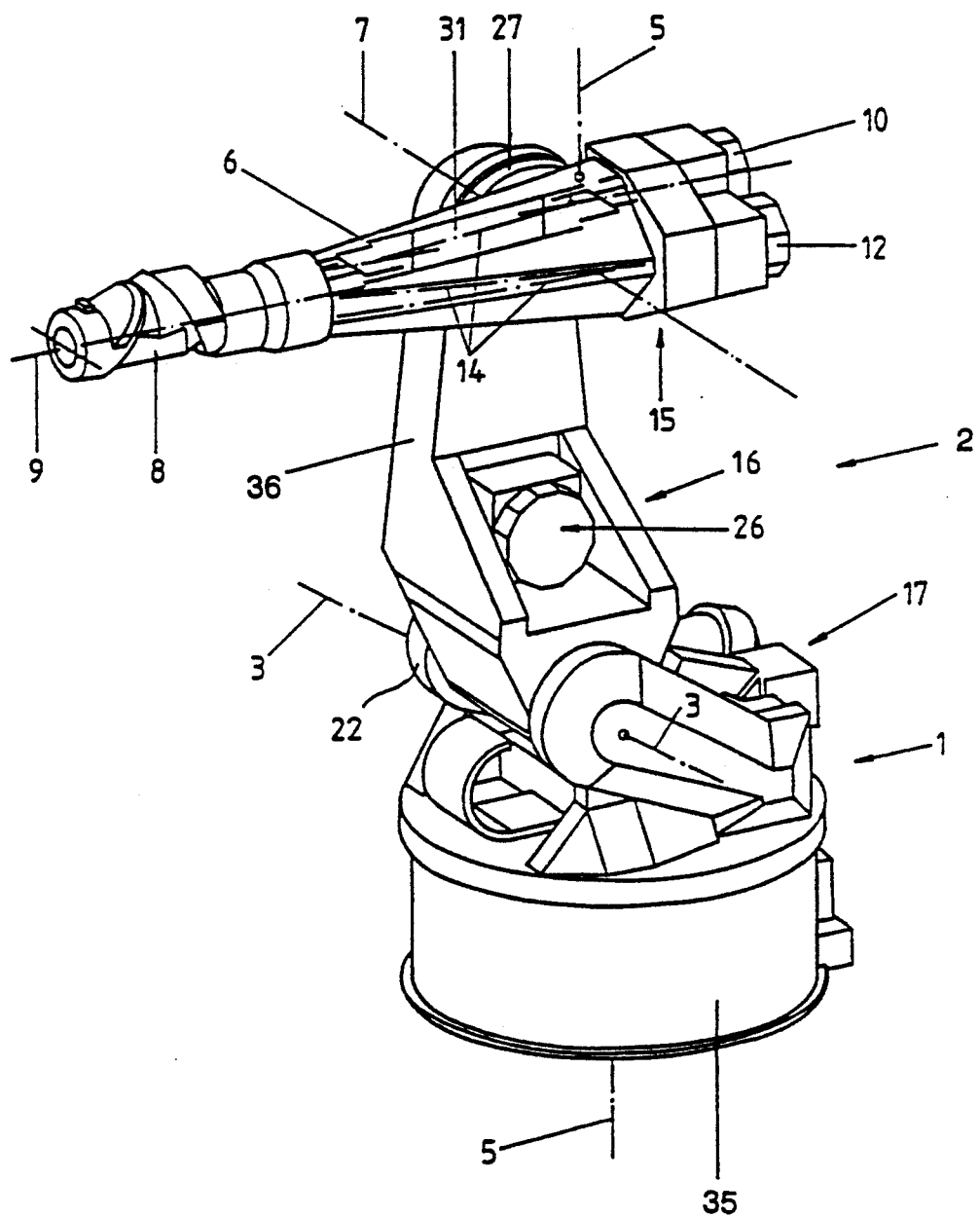
FIG. 1 is an industrial robot with motors arranged in a triangle and a one-part rocker in a perspective view.
Figure 2:
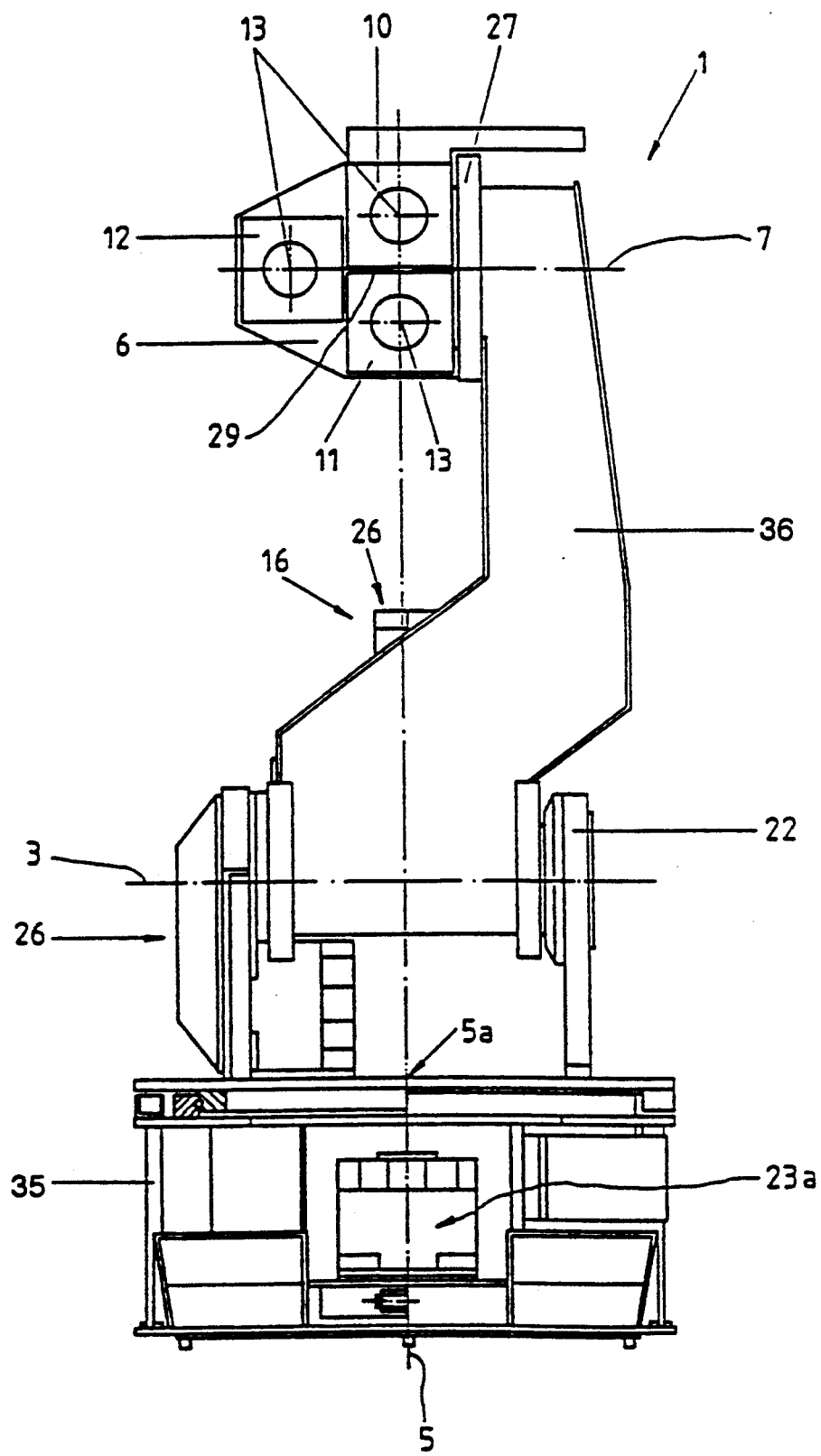
FIG. 2 is a side view according to arrow 2 in FIG. 1.
Figure 3:
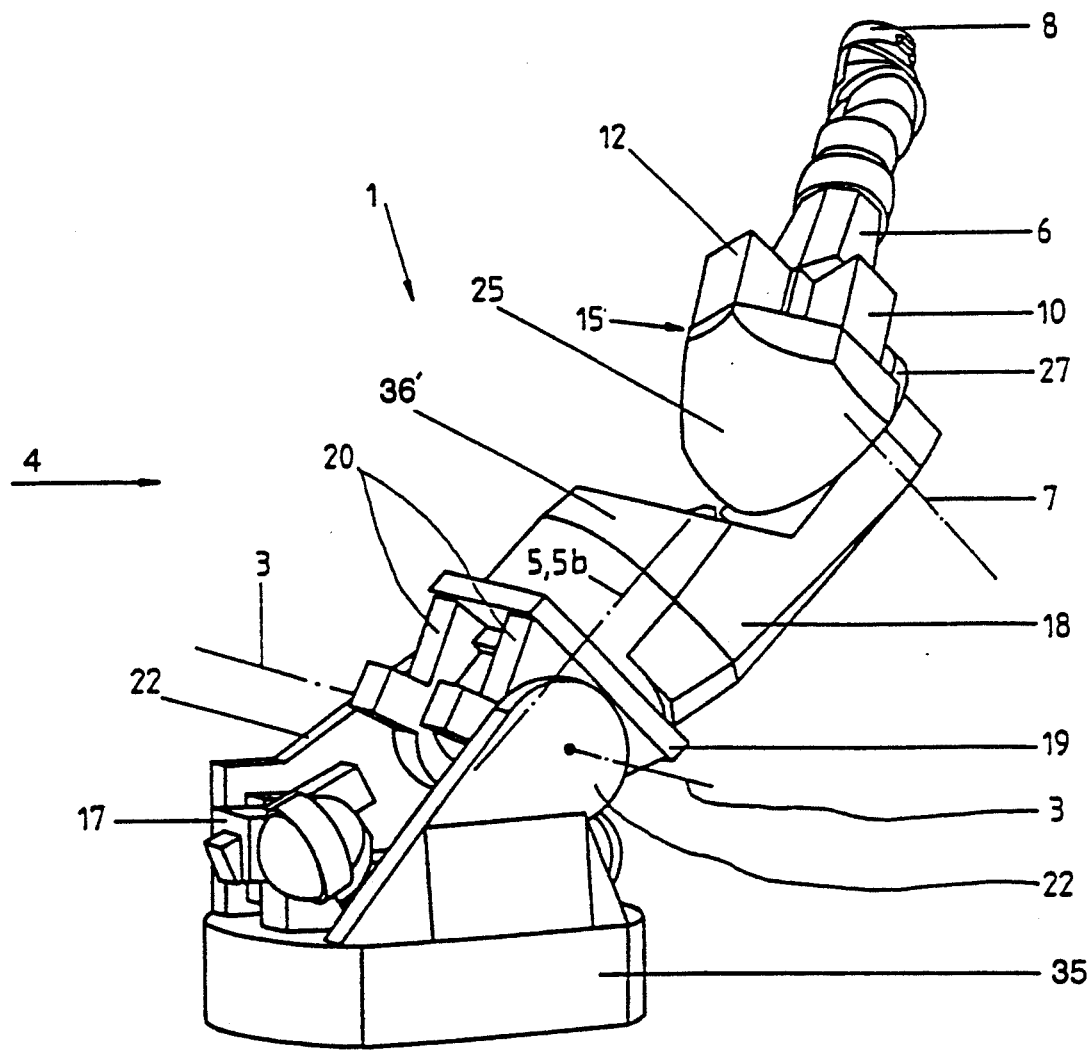
FIG. 3 is a variant of the industrial robot of FIGS. 1 and 2 with a divided rocker which can be rotated in a perspective representation.

Rocker 36 is made up in one part in FIGS. 1 and 2 and rotates with components forked mount 22 of mount 35 around the mount-rotating axis 5a opposite the ground. Here, the mount-rotating axis 5a is to be viewed as the principal rotating axis 5.

The example of embodiment of FIGS. 3-6 shows, in contrast, a modification with a rocker 36' which is divided crosswise into two parts 18, 19. In this case, mount 35 is attached rigidly to the ground, and the two rocker parts 18, 19 can be rotated opposite one another around a rocker rotating axis 5b running longitudinally between them. Here, principal rotating axis 5 consists of rocker rotating axis 5b.

A two-axial mixed form is shown in FIG. 7, which has both a mount rotating axis 5a as well as also a divided rocker 36' with a rocker rotating axis 5b. Here, the rocker-rotating axis 5b is denoted as the principal rotating axis 5.

Rocker 36, 36' is mounted in a swinging manner in all examples of embodiment around a horizontal mount swinging axis 3 on mount 35 in a forked mount 22. Swinging axis 3 is displaced from the center of the mount to the edge, which introduces an enlargement of the operating field for the industrial robot 1, as well as more free space in the foot region, for example, opposite a wall 28 (see FIG. 6).

Rocker 36, 36' is formed with one arm and has in the lower region a side corner piece or right-angle bend 16. On the upper end of the rocker, extension arm 6 is mounted around a swinging axis 7 on one side on rocker 36, 36'. Extension arm 6 can preferably swing overhead and has a large swing region of approximately 250°-300°. At the end of extension arm 6, robot hand 8 is arranged, which can operate via three axes in FIGS. 1-7. In the variants of FIGS. 8-11, there are two, three, or four axes.

Robot hand 8 can be constructed in various ways with respect to its kinematics. In the examples of embodiment that are shown, this involves an angular hand with interlaced staggered axes or a centrally constructed articulated hand. In the drawings, of the three axes, the rotating axis 9 is shown, which extends along extension arm 6 and around which robot hand 8 can rotate continuously in the extended position.

There are precisely as many drive shafts 14 as hand axes, and these extend inside the housing of extension arm 6 and are shown in the drawing by a dot-dash line. Each drive shaft 14 is combined with its own motor 10, 11, 12, 30.

In all examples of embodiment, motors 10, 11, 12, 30 are oriented parallely along extension arm 6, whereby at least two motors 10, 11, 12, 30 are arranged next to each other in the extension direction of swinging axis 7. Thus with a corresponding corner piece 16 the center of gravity 29 of the motor arrangement comes to lie opposite swinging bearing 27 on the other side of rotating axis 5.

According to FIGS. 1-7, 9 and 12, three motors 10, 11, 12 are spatially arranged such that their motor axes 13 form an isosceles triangle viewed in projection. In FIGS. 1-7 and 12, two motors 10, 11 are arranged over one another and in the direct vicinity of bearing 27 of extension arm 6 on rocker 36, 36', while the third motor 12 sits on the side and centrally next to the other two. The base of the triangle is directed in this case to bearing 27. FIG. 9 shows the rotated triangle arrangement with the peak to bearing 27. The first construction form makes possible a simpler and lighter configuration of bearing 27 with the involvement of a smaller distance of the center of gravity of the motor arrangement from rotating axis 5. The second construction form enlarges this distance for loads of a higher bearing expenditure.

In both forms of embodiment, the triangle is also oriented symmetrically to swinging axis 7, whereby motor axis 13 of individual motor 12 intersects swinging axis 7 and the other two run axially symmetrically. FIG. 2 shows this motor arrangement from behind. This symmetry has a favorable effect on the mass balance for vertical positions of the extension arm.

FIGS. 8, 10 and 11 show other variants with respect to number and arrangement of motors 10, 11, 12, 30. If only two motors 10, 11 are provided, these are arranged in the above described position and orientation to swinging axis 7. In the same way, three motors 10, 11, 12 can also lie in a row next to one another. Four motors 10, 11, 12, 30 are arranged in the form of an axially symmetrical rectangle.

In the spatial arrangement, only one or two motors 10, 11 are arranged over one another in a row and together have a smaller structural height than the fan-type arrangement of three motors in a row over one another, which was previously known. Correspondingly, extension arm 6 on rocker 36, 36' has more space overhead for swinging movements. Now rocker 4 can be shortened or the distance of motors 10, 11, 12, 30 from swinging axis 7 can be increased with the rocker length remaining the same, as desired, unlike the present state of the art, and thus the mass balance on extension arm 6 can be improved. The industrial robot 1 which is shown has a permissible carrying force of, e.g., 120 kp on robot hand 8 despite the one-sided mounting of extension arm 6.

Motors 10, 11, 12 are arranged in FIGS. 1 and 2 in the conventional way with driven side 15 toward robot hand 8 and sit at the end of extension arm 6 with some distance behind bearing 27. Here, the mass balance can be improved by increasing the distance from swinging axis 7 in the way described previously. Drive shafts 14 are directly attached onto motor axes 13 in the compact triangular or four-cornered arrangement of motors 10, 11, 12, 30. They are formed for this purpose as universal shafts 31 with cardan links and do not require intermediate shafts and intermediate bearings (see FIG. 1).

In the example of embodiment of FIGS. 3-6, 7 and 12, motors 10, 11, 12 are arranged in reversed position. Their driven side 15 is directed in this case toward the back end of extension arm 6. Motors 10, 11, 12 are attached approximately at the level of swinging axis 7 on the outside on the housing of extension arm 6 and have correspondingly a specific mutual distance. A reversing gear 24, preferably in the form of a toothed belt drive is assigned to each motor 10, 11, 12 on driven side 15 to combine with drive shafts 14. Reversing gears 24 may also form the first reducing step. Alternatively, a 1:1 translation is also possible.

Figure 12:
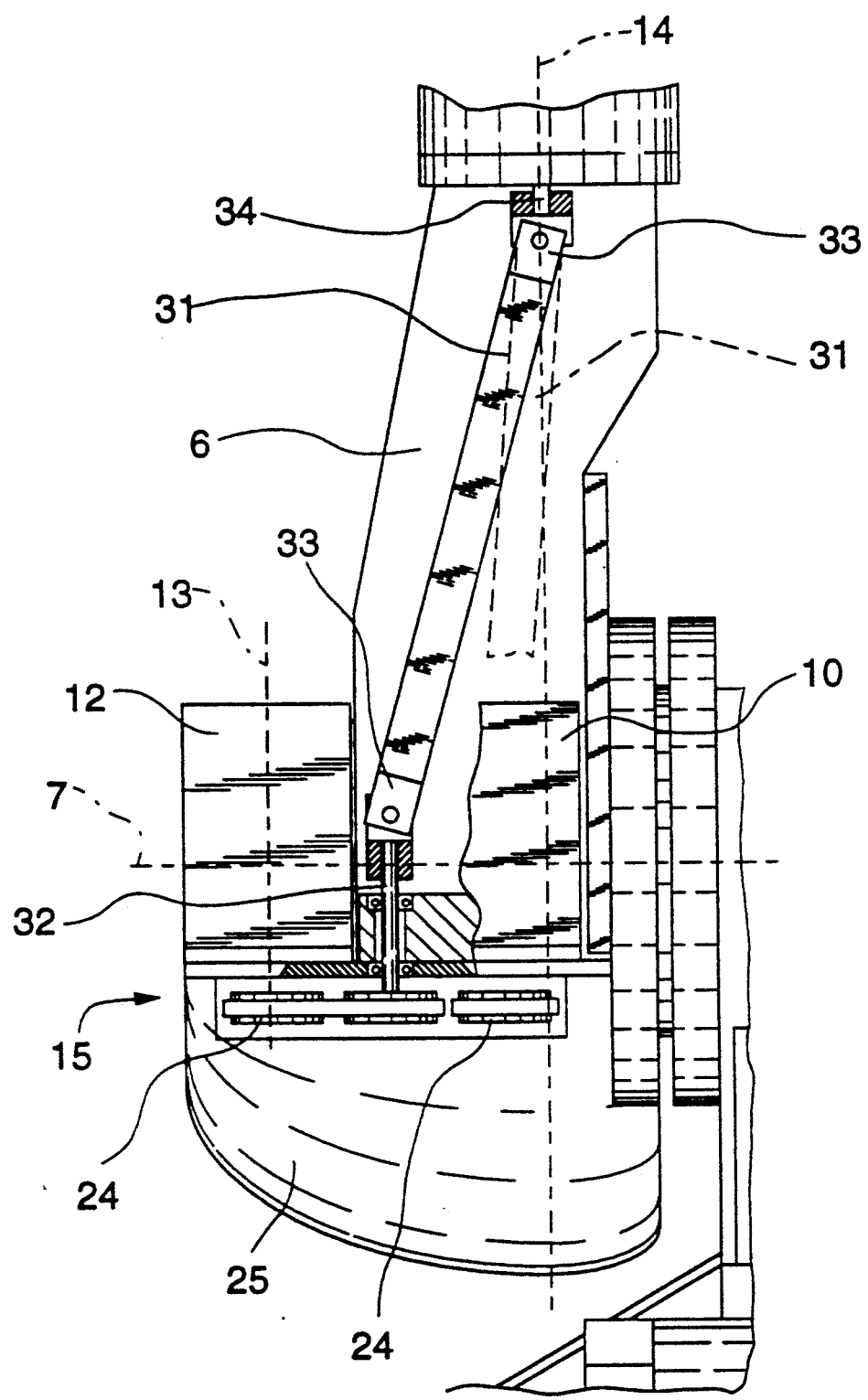
FIG. 12 shows an enlarged detail representation of the motors in reverse position with reversing drive and universal shaft according to FIGS. 3-7.

Drive shafts 14 may also be configured in the reversed motor arrangement as universal shafts 31, each with two cardan links 33. FIG. 12 illustrates this arrangement. Reversing drives 24 possess on the driven side short joining shafts 32, which are directed toward robot hand 8 and are mounted in their own stationary position. Universal shafts 31 are attached at one end onto joining shafts 32. On the other side, universal shafts 31 continue into the straight shaft sections 34, which are arranged next to each other for the connection of universal shafts 31. In the further course to the robot hand 8, shaft sections 34 are guided together into concentric shafts (not shown).

Reversing drives 24 are surrounded by a housing 25, whose outer contour is configured in the form of a ball section. The ball section has its central point on the point of intersection of swinging axis 7 with rotating axis 5 according to FIG. 4. Reversing drive 24 with housing 25, which can be configured as an added mass, can compensate for the mass balance loss due to motors 10, 11, 12 shifted toward the front to swinging axis 7. In this motor arrangement, extension arm 6 can be constructed particularly short.

In the example of embodiment of FIGS. 1 and 2, corner piece 16 is selected of a size such that the two motors 10, 11 or their motor axis 13 lie in a common plane with rotating axis 5, here in the form of the mount rotating axis 5a. The third motor 12 lies displaced to the side and offers a certain mass balance to rocker 36, 36' with respect to rotating axis 5.

Corner piece 16 is found in the lower region of rocker 36, 36', which is configured as a welded box construction. The motor is also arranged for the swinging drive 26 of extension arm 6 on rocker 36, 36' in the region of corner piece 16, and is thus positioned approximately in the previously mentioned plane through rotating axis 5. For mass balance, swinging drive 26 for swinging axis 3 is found on the side of forked mount 22 lying opposite rocker 36, 36'.

Rotating drive 23a for the mount rotating axis 5a sits centrally in mount 35. Since the moved mass of rocker 36, 36', extension arm 6, robot hand 8 and the load found thereon cannot be completely equilibrated, a balancing device 17 which operates on rocker 36, 36' is arranged on forked mount 22.

Figure 4:
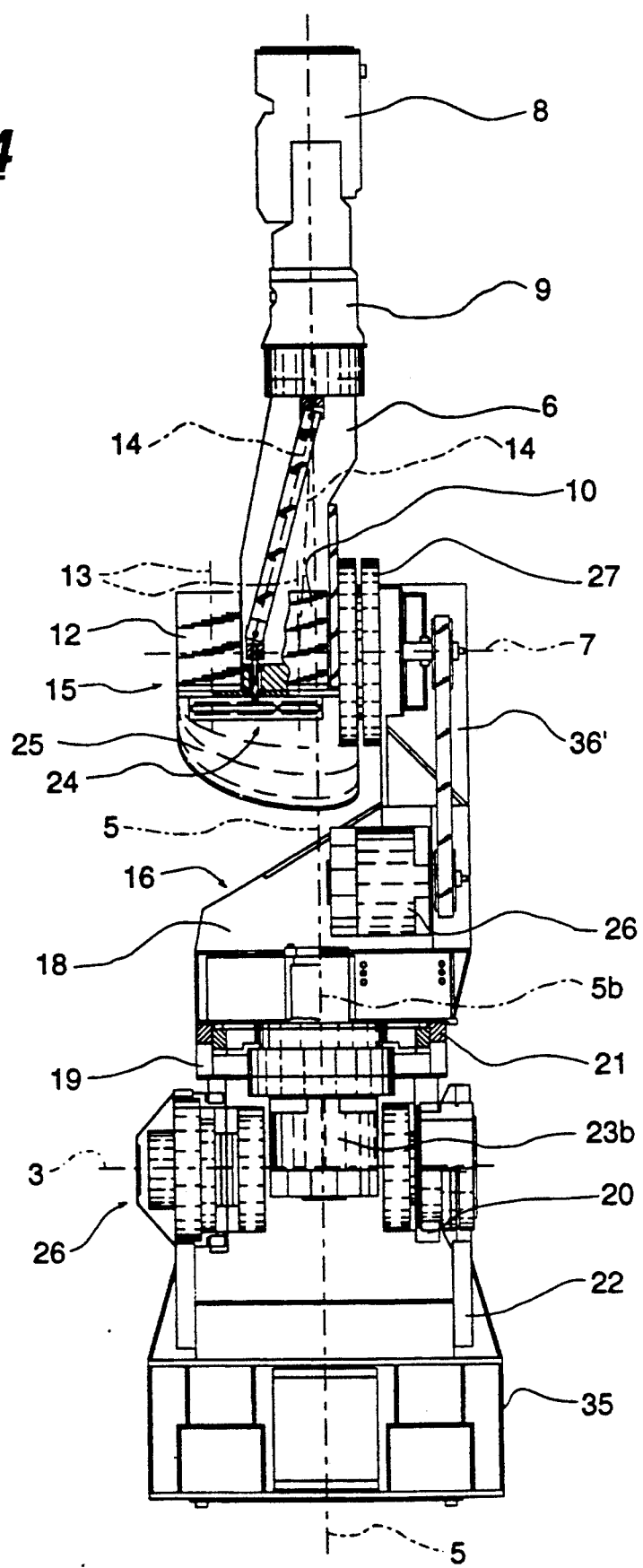
FIG. 4 is a side view according to arrow 4 of FIG. 3.

FIG. 4 shows the industrial robot 1 in an extended position. In this example of the embodiment, rocker 36, 36' is divided crosswise into an upper part 18 and a lower part 19. The two parts 18, 19 are combined with each other in a rotatable manner with the formation of the rocker rotating axis 5b. Rocker rotating axis 5b is subordinated in its action in this embodiment to swinging axis 3. As FIG. 5 illustrates, the upper part 18 can thereby rotate with extension arm 6, which confers to robot hand 8 at least a semi-spherical operating range without changing the swinging position of rocker 36, 36' on mount 35.

Figure 5A:
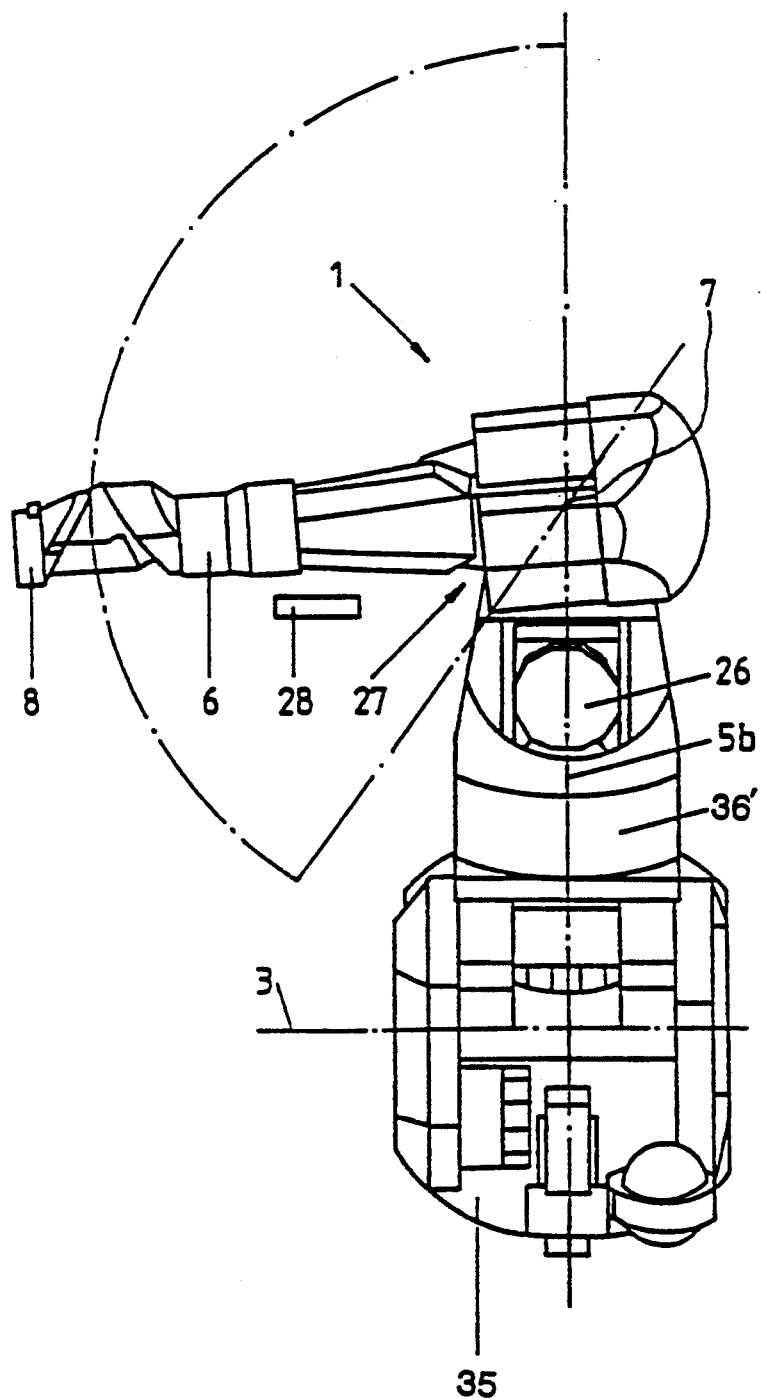
Figure 5B:
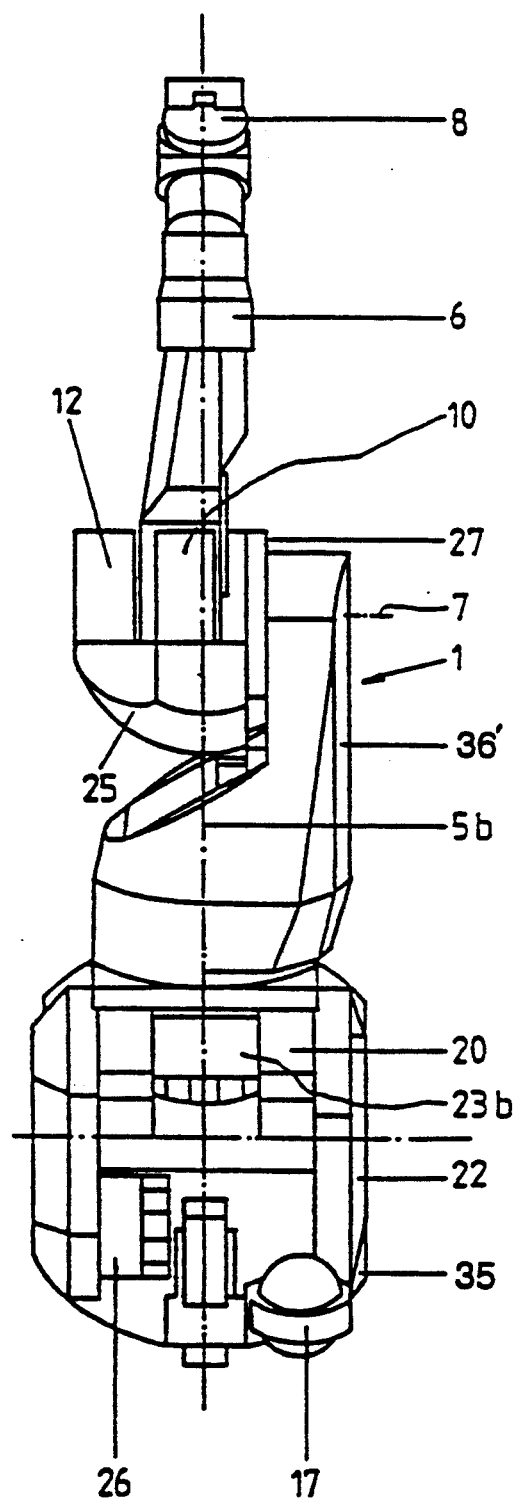
Figure 6:
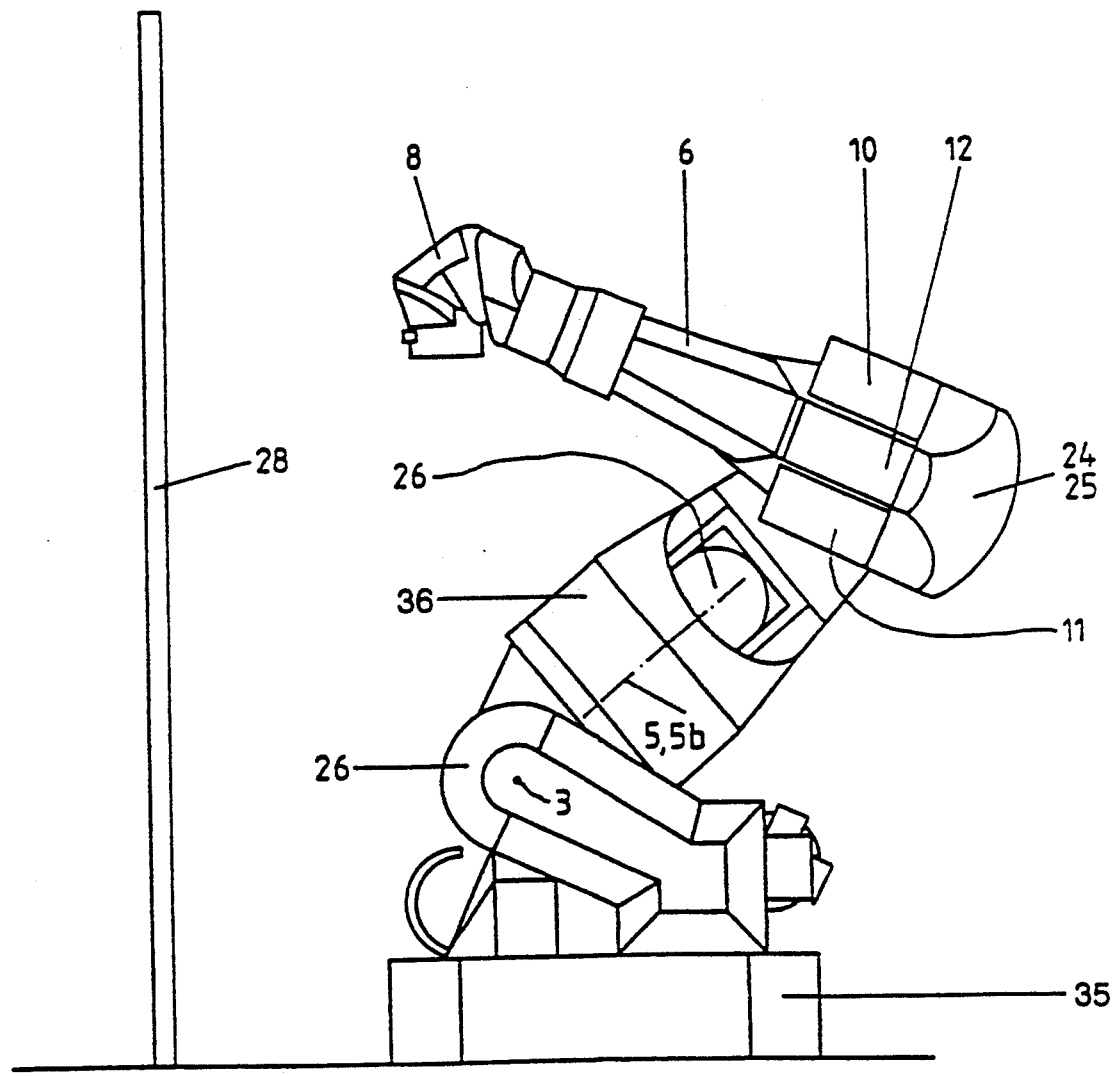

According to FIGS. 5a and 5b, two industrial robots 1 can thereby be arranged directly next to one another with minimal distance and operate separately, without mutually hindering each other. Mount 35 may also be arranged behind a post or in a fenestra, which is indicated in FIG. 5a by the small wall 28.

The short construction of extension arm 6 with motors 10, 11, 12 arranged in the reverse manner and the housing 25 shaped as a spherical section also reduces the danger of hindrance. In the elongated and in the crosswise position according to FIGS. 5a and 5b, the rear end of extension arm 6 barely projects over the outer profile of rocker 36, 36' and mount 35. Each of the two industrial robots 1 can operate thereby with the other on its own side, without danger of collision.

By swinging motions of rocker 36, 36' around swinging axis 3, the previously mentioned at least semi-spherical operating ranges are broadened into an extended or hoop-shaped operating space.

As FIG. 4 illustrates, lower part 19 of rocker 36' is provided with a forked bearing 20, which is surrounded on the outer side by forked mount 22 and is mounted in a rotatable manner therein. Inside forked bearing 20 a free space is formed in which rotating drive 23b of rocker rotating axis 5b is arranged. Rotating drive 23b consists of a motor and a stepdown gear, which are arranged in the vicinity of swinging axis 3. Rotating drive 23b may also be shifted backward for further optimization of the mass balance of rocker 36, 36' in part or completely via swinging axis 3. In the example of embodiment shown, pivot bearing 21 is found above forked mount 22. This can also be shifted further downward.

FIG. 7 shows a variant with a mount rotating axis 5a as an additional or first rotating axis, which is arranged centrally to the rocker rotating axis 5b and can rotate all around the robot structural group following the forked mount 22 opposite the ground. The mobility of this seven-axis industrial robot 1 is essentially broadened. A series of spherical working spaces arises first by swinging motions of extension arm 6 and rocker 36, 36' around their swinging axes 7, 3 with simultaneous rotation of upper part 18 around swinging-rotating axis 5b. The rotation of these around mount rotating axis 5a further produces an even larger spherical-shaped working space.

I claim:
1. A multiaxial robot comprising:
   a mount;
   a rocker arm rotatably connected at one end about a principal rotating axis to said mount, said rocker arm also being pivotably connected at said end about a mount swing axis to said mount;
   an extension arm connected on another end of said rocker arm and pivotable about an extension swing axis extending from a drag bearing in a side of said rocker arm;
   a robot hand connected to one end of said extension arm, said robot hand including a plurality of members;
   a plurality of motor means for driving each of said plurality of members of said robot hand, each of said plurality of motor means being positioned on said extension arm, two of said plurality of motor means being positioned adjacent each other in a direction of said extension swing axis, said principal rotating axis extending in an area between a center of gravity of said motor means and said drag bearing of said rocker arm.
2. A multiaxial robot in accordance with claim 1, wherein:
   said plurality of motor means are arranged substantially symmetrically about said extension swing axis.
3. A multiaxial robot in accordance with claim 1, wherein:
   said plurality of motor means contains three motor means positioned in a triangle.
4. A multiaxial robot in accordance with claim 3, wherein:
   said triangle is a substantially isosceles triangle.
5. A multiaxial robot in accordance with claim 4, wherein:
   a base of said isosceles triangle is positioned adjacent said drag bearing of said rocker arm.
6. A multiaxial robot in accordance with claim 1, wherein:
   said rocker arm has a substantially right angle bend.
7. A multiaxial robot in accordance with claim 1, wherein:
   two of said plurality of motor means are adjacent said drag bearing of said rocker arm and are in a plane with said principal rotating axis.
8. A multiaxial robot in accordance with claim 1, wherein:
   said plurality of motor means have a driven side positioned towards said robot hand, said plurality of motor means being positioned on an opposite side of said extension swing axis from said robot hand.
9. A multiaxial robot in accordance with claim 8, wherein:
   each of said plurality of motor means includes a motor axis, and each of said motor axes are connected to cardan shafts.
10. A multiaxial robot in accordance with claim 1, wherein:
    said plurality of motor means have a driven side positioned away from said robot hand and said driven side is adjacent said extension swing axis.
11. A multiaxial robot in accordance with claim 10, wherein:
    said plurality of motor means are positioned on an outside of said extension arm and at mutually spaced locations.
12. A multiaxial robot in accordance with claim 10, further comprising:
    reversing gears connected to said driven side of said plurality of motor means;
    drive shafts connecting said reversing gears to said robot hand.
13. A multiaxial robot in accordance with claim 12, wherein:
    said drive shafts are designed as cardan shafts.
14. A multiaxial robot in accordance with claim 12, wherein:
    said reversing gears are arranged in a spherical shaped housing.
15. A multiaxial robot in accordance with claim 1, wherein:
    said rocker arm is transversely divided into first and second parts with said first and second parts being rotatably connected and rotatable about a rocker rotating axis.
16. A multiaxial robot in accordance with claim 15, wherein:
    said second part of said rocker arm includes a bearing yoke;
    said mount includes a frame yoke pivotably connected to said bearing yoke; and
    said bearing yoke includes a rotating drive for rotating the first and second parts of said rocker arm about said rocker rotating axis.
17. A multiaxial robot in accordance with claim 15, wherein:
    said principal rotating axis is separate from said rocker rotating axis.
18. A multiaxial robot comprising:
    a mount;
    a rocker arm rotatably connected at one end about a principal rotating axis to said mount;
    an extension arm connected on another end of said rocker arm and pivotable about an extension swing axis extending from a lateral side of said rocker arm, said extension swing axis being substantially perpendicular to a longitudinal direction of said rocker arm and said extension arm;
a robot hand connected to one end of said extension arm, said robot hand including a plurality of members;
a plurality of motor means for driving each of said plurality of members of said robot hand, each of said plurality of motor means being positioned on said extension arm, two of said plurality of motor means being positioned adjacent each other in a direction of said extension swing axis, a plane containing said principal rotating axis extending between a center of gravity of said motor means and said lateral side of said rocker arm.

19. A multiaxial robot in accordance with claim 18, wherein:
said principal rotating axis is substantially parallel to a longitudinal axis of said rocker arm.

* * * * *